(12) United States Patent
Ray

(10) Patent No.: US 7,331,595 B2
(45) Date of Patent: Feb. 19, 2008

(54) AUXILIARY BICYCLE SEAT FOR STAND-UP UPHILL PEDALING SUPPORT

(76) Inventor: William Ray, 1912 State Highway 206 East, Greene, NY (US) 13778

( * ) Notice: Subject to any disclaimer, the term of this patent is extended or adjusted under 35 U.S.C. 154(b) by 382 days.

(21) Appl. No.: 11/187,201

(22) Filed: Jul. 22, 2005

(65) Prior Publication Data

US 2007/0018424 A1    Jan. 25, 2007

(51) Int. Cl.
*B62J 39/00* (2006.01)

(52) U.S. Cl. .................................... 280/288.4

(58) Field of Classification Search ............ 280/288.4; 297/195.12, 195.1
See application file for complete search history.

(56) References Cited

U.S. PATENT DOCUMENTS 4,632,453 A * 12/1986 Robbin et al. .............. 297/243
5,297,846 A * 3/1994 Rafter .................... 297/195.12
6,616,224 B2 * 9/2003 Tsuge .................... 297/195.12
6,631,948 B1 * 10/2003 Tsuge .................... 297/195.12
6,685,265 B1 * 2/2004 Moore, Jr. ............. 297/195.13

* cited by examiner

*Primary Examiner*—Lesley D. Morris
*Assistant Examiner*—Michael Stabley
(74) *Attorney, Agent, or Firm*—Donald W. Meeker

(57) ABSTRACT

An auxiliary hill climbing bicycle seat is formed from a T-shaped tubular structure attached, preferably by welding, to a bicycle cross bar. A narrow foam padding and a cover over the T-shaped pipe form a narrow auxiliary hill climbing seat positioned in front of the regular seat directly over the pedals in an elevated position higher than the regular seat. A substantial forward portion of the foam is tapered inwardly to allow full clearance for the cyclists thighs.

8 Claims, 2 Drawing Sheets

AUXILIARY BICYCLE SEAT FOR STAND-UP UPHILL PEDALING SUPPORT

BACKGROUND OF THE INVENTION

1. Field of the Invention

The present invention relates to bicycle seats and particularly to an auxiliary hill climbing seat mounted to the crossbar frame of the bicycle in front of and higher than the regular bicycle seat, which is used for support while the rider is in a stand-up pedaling position for pedaling uphill, said auxiliary seat is disposed between the sitting seat and the handle bars and is positioned directly over the bicycle pedals.

2. Description of the Prior Art

On flat or downhill riding, especially in racing, it is important for a cyclist to maintain a low profile seated on the regular bicycle seat and bent over leaning forward to reduce wind resistance to maximize speed. In uphill riding, cyclists often have to pedal in a stand-up position so that the body weight directly over the pedals produces extra power to provide a mechanical advantage to increase uphill speed over the sitting position on the regular bicycle seat which is not directly over the pedals and causes more muscle strain when trying to apply extra power during uphill cycling in a seated position on the regular seat. The wind resistance is not the significant factor in uphill cycling when power is the major factor for optimizing speed. The stand-up peddling position can cause greater fatigue however. The prior art does not adequately address the problem of allowing maximum power and speed in uphill cycling while minimizing fatigue and muscle strain.

U.S. Patent Application #20030227198, published Dec. 11, 2003 by Menayan, is for an adjustable saddle slide assembly that is placed between a bicycle saddle and a mast supporting the saddle, which allows a rider to adjust the saddle position while the cyclist is riding the bicycle. The assembly has two main positions, a forward position and a back position. The forward position maximizes use of the rider's fast twitch muscle groups and is the optimal saddle position for short sprint races and up-hill climbs. The back position maximizes the rider's slow twitch muscle groups and is the optimal position for long endurance races. The assembly uses a quick release mechanism to lock and unlock the saddle in place and allow for adjustments to be made "on the fly". In order to maintain a constant distance between the saddle and the pedal axis, or bottom bracket, the assembly raises the height of the saddle slightly when the saddle is slid forward.

U.S. Pat. No. 5,297,846, issued Mar. 29, 1994 to Rafter, is for a pivoting bicycle seat assembly which includes a forward, upward extending, and rigid support member adjustably attached to the seat tube on a bicycle. In one embodiment, the support member has an adjustable collar assembly which enables the support member to be attached to a standard seat post which is inserted into the seat tube. A v-shaped, extension arm is pivotally attached to the support member. The extension arm may be rotated between a rearward extending position and a forward extending position. The standard bicycle seat, called a primary seat structure herein, is attached to the top surface of one leg segment of the extension arm with a secondary seat structure is attached to the rear surface. When the extension arm is disposed in the rearward extending position, the primary seat structure may be used for normal riding. When the rider climbs an incline surface, the extension arm is rotated forward in a counter-clockwise clockwise direction to the forward extended position. In the extension arm is disposed in the forward extended position, the secondary seat structure is disposed in a position to support a rider in a standing position. The distance of the secondary seat structure is sufficient so that pedal distance is maintained for full leg extension.

U.S. Pat. No. 6,631,948, issued Oct. 14, 2003 to Tsuge, provides a unitary seat assembly for mounting a pair of seats on a bicycle, which includes a central longitudinal bar portion and a first and second vertical bar portion having different lengths which extend from the central bar portion. Bicycle seats are mounted on the ends of said first and second bar portions, one of said seats being above the pedals of the bicycle while the second seat is positioned either behind or in front of the first seat. The first seat is set at a height to permit the full downward extension of the rider's legs when pedaling while the second seat is set at a height low enough to permit the rider's legs to comfortably reach the ground.

U.S. Pat. No. 6,616,224, issued Sep. 9, 2003 to Tsuge, claims a unitary seat assembly for mounting a pair of seats on a bicycle, which includes a central longitudinal bar portion and a first and second vertical bar portion having different lengths which extend from the central bar portion. Bicycle seats are mounted on the ends of said first and second bar portions, one of said seats being above the pedals of the bicycle while the second seat is positioned either behind or in front of the first seat. The first seat is set at a height to permit the full downward extension of the rider's legs when pedaling while the second seat is set at a height low enough to permit the rider's legs to comfortably reach the ground. The higher of the two seats may be pivotally mounted to facilitate moving to the lower seat.

U.S. Pat. No. 4,632,453, issued Dec. 30, 1986 to Robbin, shows an auxiliary support system for a bicycle passenger. A seat mount assembly is affixed to the horizontal tubular frame member of a bicycle between the primary seat and neck. A conventional bicycle seat is attachable to the seat mount assembly.

U.S. Pat. No. 409,964, issued Aug. 27, 1889 to Harvey, describes a child carrier which is mounted on the main seat post of a bicycle, the child's seat being positioned in front of the operator's seat.

U.S. Pat. No. 6,609,751, issued Aug. 26, 2003 to Angelo, depicts a bicycle seat with a pair of guide rails each having a seat pad pivotably attached to the front end of the guide rail. An elongated support has a wing at each end. The guide rails travel on the wings in two substantially parallel paths. A pulley is mounted on the center of the elongated support. One or more straps are connected to the front ends of the guide rails or the back ends of the guide rails so that motion of one guide rail in a first direction causes movement of the second guide rail in an opposite direction. One or more springs can be connected between the guide rails and the elongated support. A horn shown could replace the safety cap and extend forward from the seat bracket to provide the sensation of the former saddle seat when standing. This horn could be used to steer and absorb shock while the rider pinches the horn with his or her knees to keep the bicycle under the rider.

What is needed in an auxiliary hill climbing seat positioned over the bicycle pedals in front of the regular seat and higher than the regular seat to provide full peddling in a stand-up pedaling position using the weight of the body bearing down on the pedals to maximize power and uphill speed while still resting on the hill climbing seat to minimize fatigue and muscle strain.

SUMMARY OF THE INVENTION

An object of the present invention is to provide an auxiliary hill climbing seat positioned over the bicycle pedals in front of the regular seat and higher than the regular seat to provide full peddling in a stand-up pedaling position using the weight of the body bearing down on the pedals to maximize power and uphill speed by putting more power into pedaling with an easier muscle push with less muscle strain in the stand-up pedaling position while still resting on the hill climbing seat to minimize fatigue.

A corollary object of the present invention is to position the auxiliary hill climbing seat in front of the regular bicycle seat and slightly elevated higher than the regular bicycle seat so that it is easy for a cyclist to make the transition from the regular seat to the auxiliary hill climbing seat for steep uphill cycling and for fast surges using stand-up pedaling and easy to make the transition back to the regular seat for more level cycling and downhill cycling.

A related object of the present invention is to provide an auxiliary bicycle seat formed from a T-shaped pipe mounted above a bicycle cross bar with the pipe parallel to the crossbar and a narrow foam padding and a cover over the T-shaped pipe for a narrow auxiliary hill climbing seat positioned in front of the regular seat in an elevated position over the pedals to permit full "stand-up" peddling in a standing position while the narrow seat profile allows full leg movement pedaling without rubbing against the seat and chafing the upper inner thighs of the cyclist.

Another related object of the present invention is to provide the simple foam covered T-bar for an inexpensive and easily fabricated auxiliary hill climbing bicycle seat.

A related object of the present invention is to provide a foam seat covering with a substantial forward portion of the foam tapered inwardly to allow full clearance for the cyclists thighs to permit free stand-up pedaling motion while using the auxiliary hill climbing seat.

A further object of the present invention is to provide a vertical shaft support for the auxiliary hill climbing bicycle seat which support can be easily and inexpensively welded to the cross bar of a bicycle in fabrication of the bicycle or as a retrofit on an existing bicycle.

A connected object of the present invention is to provide a telescoping vertical support to enable height adjustment of the auxiliary hill climbing seat to adapt to different cyclists with different leg heights and for different riding situations and riding styles for the same cyclist.

A related object of the present invention is to provide an elongated arched channel bracket at the base of the support aligned with and parallel to the arms of the T at the top, the channel bracket configured to fit over and attach to a cross bar of an extremely lightweight bicycle for reinforcing the cross bar to support the auxiliary hill climbing seat.

In brief, an auxiliary hill climbing bicycle seat is formed from a T-shaped pipe attached, preferably by welding, to a bicycle cross bar with the pipe parallel to the crossbar and a narrow foam padding and a cover over the T-shaped pipe to form a narrow auxiliary hill climbing seat positioned in front of the regular seat directly over the pedals in an elevated position higher than the regular seat. A substantial forward portion of the foam is tapered inwardly to allow full clearance for the cyclists thighs.

The vertical support post of the auxiliary hill climbing seat is welded to the cross bar of a bicycle in fabrication of the bicycle or as a retrofit on an existing bicycle. An elongated arched channel bracket at the base of the support aligned with and parallel to the arms of the T at the top is configured to fit over and attach, preferably by welding, to a cross bar of an extremely lightweight bicycle for reinforcing the cross bar to support the auxiliary hill climbing seat. The vertical support bar is preferably a telescoping vertical support to enable height adjustment of the auxiliary hill climbing seat.

An advantage of the present invention is that it provides an auxiliary hill climbing seat to maximize power and uphill speed while providing an easier muscle push with less muscle strain in the stand-up pedaling position while still resting on the hill climbing seat to minimize fatigue.

Another advantage of the present invention is that it is easy for a cyclist to make the transition from the regular seat to the auxiliary hill climbing seat and easy to make the transition back to the regular seat for more level cycling and downhill cycling.

A further advantage of the present invention is that it permits full "stand-up" peddling in a standing position with full leg movement pedaling without rubbing against the seat and chafing the upper inner thighs of the cyclist.

Yet another advantage of the present invention is that it is an inexpensive and easily fabricated auxiliary hill climbing bicycle seat.

One more advantage of the present invention is that it allows full clearance for the cyclists thighs to permit free stand-up pedaling motion while using the auxiliary hill climbing seat.

A still further advantage of the present invention is that it can be easily and inexpensively welded to the cross bar of a bicycle in fabrication of the bicycle or as a retrofit on an existing bicycle.

A further additional advantage of the present invention is that it enables height adjustment of the auxiliary hill climbing seat.

One further advantage of the present invention is that it has a bracket to fit over and attach to a cross bar of an extremely lightweight bicycle for reinforcing the cross bar to support the auxiliary hill climbing seat.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figures 1A, 1B:
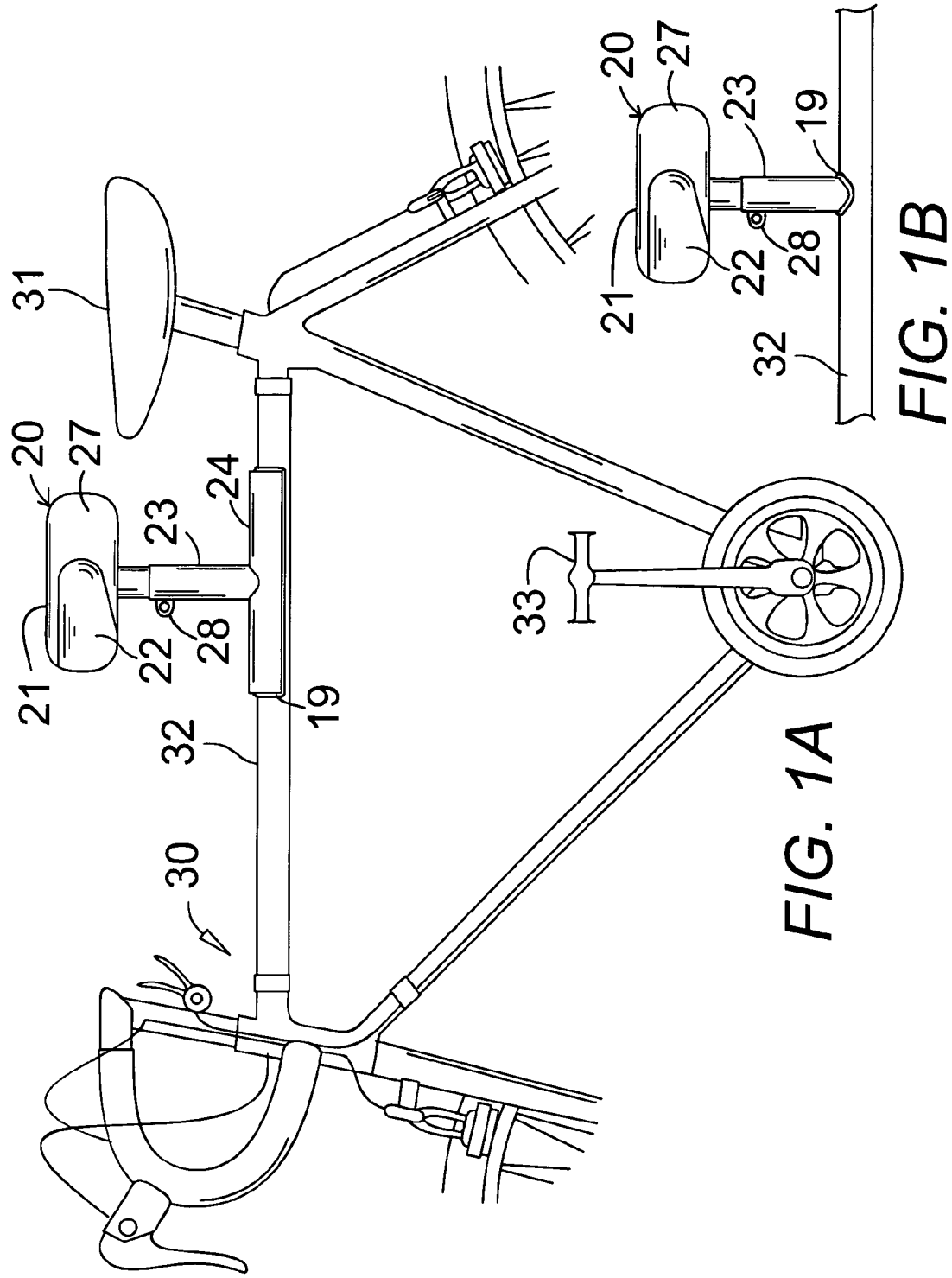
FIG. 1A is a side elevational view of the auxiliary hill climbing seat of the present invention having secured to the bottom of the vertical support post an elongated arched attaching channel welded to the cross bar of a bicycle in front of the regular bicycle seat.
FIG. 1B is a side elevational view of the auxiliary hill climbing seat of the present invention having the vertical support post welded to the cross bar of a bicycle in front of the regular bicycle seat.
Figure 2:
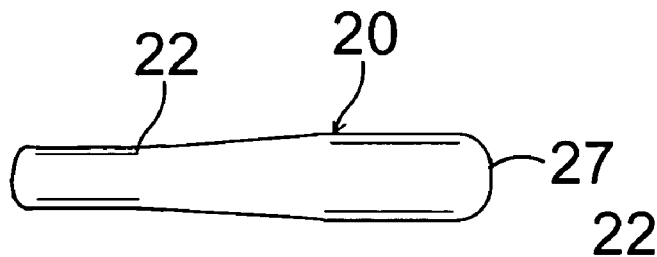
FIG. 2 is a top plan view of the auxiliary hill climbing seat of the present invention showing a substantial forward portion of the foam seat covering tapered inwardly for over half the length of the seat.

In FIGS. 1-4, an auxiliary hill climbing bicycle seat device for support during stand-up pedaling for uphill cycling is mounted on a crossbar 32 directly above the bicycle pedals 33 in front of the regular bicycle seat 31. The auxiliary hill climbing seat 20 is secured preferably by a weld 19 to the crossbar 32 of a bicycle directly above a pair of bicycle pedals 33.

Figure 4A:
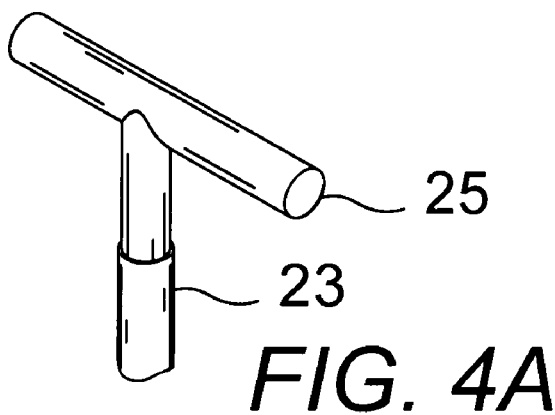
FIG. 4A is a perspective view of a T-shaped pipe forming the inner structure of the auxiliary hill climbing seat of the present invention with the vertical support post and top cross bar for receiving the foam seat padding.
Figure 4B:
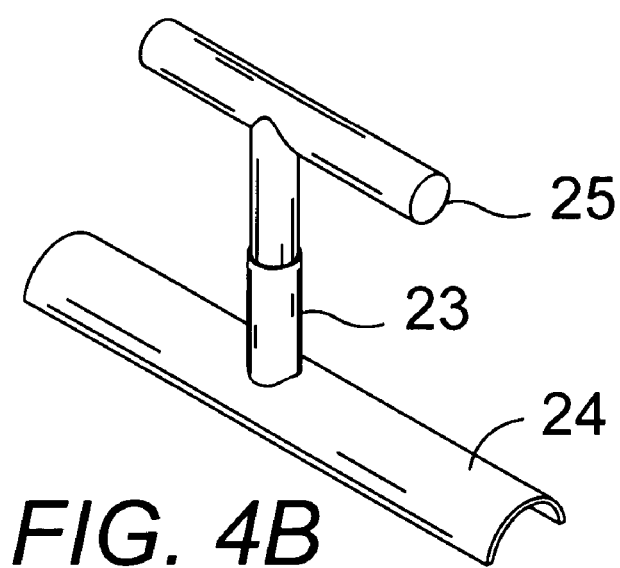
FIG. 4B is a perspective view of the T-shaped pipe forming the inner structure of the auxiliary hill climbing seat of FIG. 4A showing, attached to the bottom of the vertical support post, an additional bottom elongated arched attaching channel for welding to the cross bar of a bicycle.

The hill climbing seat 20 preferably comprise a T-shaped tubular structure, as shown in FIGS. 4A and 4B, mounted to a bicycle cross bar 32, as shown in FIGS. 1A and 1B, with a top horizontal support bar 25 forming a rigid narrow interior structure, parallel to the crossbar 32 and an elongated padding element 27 narrow form side to side mounted over the top horizontal support bar 25 of the T to form a horizontal rigid cyclist supporting portion 27 with a narrow straight top 21 which a cyclist straddles and rests on while engaged in stand-up peddling on an incline, the padding element used to soften an exterior of the cyclist supporting portion. The cyclist supporting portion 27 having a sufficiently narrow width from side to side, preferably thee inches or less, to enable a cyclist to straddle the cyclist supporting structure resting thereon with both legs of the cyclist free to pedal with both legs of the cyclist straight down without the upper inner thighs of the cyclist rubbing or chaffing on the sides of the hill climbing seat.

The hill climbing seat 20 is positioned in front of a standard bicycle seat 31 and positioned higher than the standard bicycle seat to enable a bicycle rider to move from a sitting bent forward aerodynamic position on the standard seat during level and downhill riding and move forward and upward to the hill climbing seat 20 for pedaling in a stand-up peddling position over the pedals while resting on the hill climbing seat to enable the full weight of the rider located above the pedals to push down on the pedals while still resting on the hill climbing seat during uphill riding.

A forward portion 22 of the padding element is tapered inwardly to allow full clearance for the cyclists thighs to permit free stand-up pedaling motion while using the auxiliary hill climbing seat. The hill climbing bicycle seat preferably comprises a water resistant cover over the padding element.

Figure 3:
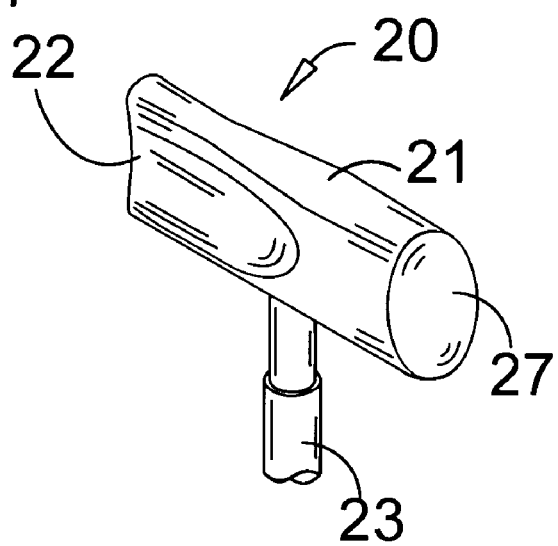
FIG. 3 is a perspective view of the auxiliary hill climbing seat of the present invention showing a substantial forward portion of the foam seat covering tapered inwardly for over half the length of the seat.

In FIGS. 1B, 3, and 4A, the bottom end of the vertical support post 23 is attached by a weld 19 to the cross bar 32 of the bicycle.

In FIGS. 1A and 4B, the device further comprising an elongated arched channel bracket 24 at a bottom end of the vertical support post 23 aligned with and parallel to the top cyclist supporting portion 27. The arched channel bracket 24 is configured to fit over and attach, preferably by a weld 19 as in FIG. 1A, to the cross bar 32 of the bicycle to support the auxiliary hill climbing seat 27 and to reinforce the cross bar 32.

In FIGS. 1A and 1B, the vertical support post 23 preferably comprises a telescoping vertical support with a seat post clamp 28 to enable height adjustment of the hill climbing seat.

The T-shaped tubular structure is preferably formed of one inch aluminum or other lightweight strong tubing and the padding is preferably a dense foam cushion.

It is understood that the preceding description is given merely by way of illustration and not in limitation of the invention and that various modifications may be made thereto without departing from the spirit of the invention as claimed.

What is claimed is:

1. An auxiliary hill climbing bicycle seat device for stand-up pedaling directly above the bicycle pedals while resting on the hill climbing bicycle seat, the hill climbing bicycle seat comprising:

a hill climbing seat secured to a crossbar of a bicycle directly above a pair of bicycle pedals, the hill climbing seat comprising a vertical rigid support post attached to the crossbar of the bicycle and a horizontal rigid cyclist supporting portion attached to the top of the vertical support bar parallel to the crossbar, the rigid cyclist supporting portion comprising a rigid narrow interior structure covered by an outer padding to soften an exterior of the cyclist supporting portion, the cyclist supporting portion having a sufficiently narrow width from side to side to enable a cyclist to straddle the cyclist supporting structure resting thereon with both legs of the cyclist free to pedal with both legs of the cyclist straight down without the upper inner thighs of the cyclist rubbing or chaffing on the sides of the hill climbing seat, the hill climbing seat positioned in front of a standard bicycle seat and positioned higher than the standard bicycle seat to enable a bicycle rider to move from a sitting bent forward aerodynamic position on the standard seat during level and downhill riding and move forward and upward to the hill climbing seat for pedaling in a stand-up peddling position over the pedals while resting on the hill climbing seat to enable the full weight of the rider located above the pedals to push down on the pedals while still resting on the hill climbing seat during uphill riding.

2. The auxiliary hill climbing bicycle seat device of claim 1 wherein the hill climbing bicycle seat comprises a T-shaped tubular structure mounted above a bicycle cross bar with a top horizontal support bar parallel to the crossbar and an elongated padding element narrow form side to side mounted over the top horizontal support bar of the T.

3. The auxiliary hill climbing bicycle seat device of claim 2 further comprising a water resistant cover over the padding element.

4. The auxiliary hill climbing bicycle seat device of claim 2 wherein a forward portion of the padding element is tapered inwardly to allow full clearance for the cyclists thighs to permit free stand-up pedaling motion while using the auxiliary hill climbing seat.

5. The auxiliary hill climbing bicycle seat device of claim 1 wherein a bottom end of the vertical support post is welded to the cross bar of the bicycle.

6. The auxiliary hill climbing bicycle seat device of claim 1 further comprising an elongated arched channel bracket at a bottom end of the vertical support post aligned with and parallel to the cyclist supporting portion, the arched channel bracket configured to fit over and attach to the cross bar of the bicycle to support the auxiliary hill climbing seat and to reinforce the cross bar.

7. The auxiliary hill climbing bicycle seat device of claim 6 wherein the elongated arched channel bracket is welded to the cross bar of the bicycle.

8. The auxiliary hill climbing bicycle seat device of claim 1 wherein the vertical support post comprises a telescoping vertical support to enable height adjustment of the hill climbing seat.

* * * * *